United States Patent
Madraswala et al.

(10) Patent No.: US 12,488,817 B2
(45) Date of Patent: Dec. 2, 2025

(54) ENHANCED IO INTERFACE FOR PLC PROGRAM AND PROGRAM-SUSPEND-RESUME OPERATIONS

(71) Applicant: Intel NDTM US LLC, Santa Clara, CA (US)

(72) Inventors: Aliasgar S. Madraswala, Folsom, CA (US); Sagar Upadhyay, Folsom, CA (US)

(73) Assignee: Intel NDTM US LLC, Santa Clara, CA (US)

( * ) Notice: Subject to any disclaimer, the term of this patent is extended or adjusted under 35 U.S.C. 154(b) by 45 days.

(21) Appl. No.: 18/233,852

(22) Filed: Aug. 14, 2023

(65) Prior Publication Data

US 2023/0395107 A1   Dec. 7, 2023

(51) Int. Cl.
*G11C 7/00* (2006.01)
*G11C 7/10* (2006.01)
*G11C 29/52* (2006.01)

(52) U.S. Cl.
CPC .......... *G11C 7/1096* (2013.01); *G11C 7/1039* (2013.01); *G11C 29/52* (2013.01)

(58) Field of Classification Search
CPC ..... G11C 11/5628; G11C 16/10; G11C 16/26; G11C 16/0483; G11C 16/08; G11C 16/3459; G11C 2029/0411; G11C 7/1087; G11C 11/5642; G11C 2211/5642; G11C 29/52; G11C 16/102; G11C 16/3481; G11C 29/021; G11C 7/106; G11C 11/5671; G11C 2211/5641; G11C 2211/5643; G11C 16/32; G11C 2207/2245; G11C 11/5621; G11C 16/3495; G11C 7/1006; G11C 11/005; G11C 13/0002; G11C 13/0069; G11C 16/3418; G11C 2207/2236; G11C 2213/71; G11C 2216/20; G11C 29/028; G11C 7/1078; G11C 8/16; G11C 16/04; G11C 16/0408; G11C 16/225; G11C 16/30; G11C 16/3436; G11C 2211/562; G11C 2211/5621; G11C 2211/5623; G11C 2211/563; G11C 2211/5648; G11C 29/82; G11C 5/005; G11C 5/143; G11C 5/148;

(Continued)

(56) References Cited

U.S. PATENT DOCUMENTS 10,304,559 B2 *   5/2019   Naik .................. G11C 11/5642

* cited by examiner

*Primary Examiner* — Thong Q Le
(74) *Attorney, Agent, or Firm* — Morgan, Lewis & Bockius LLP

(57) ABSTRACT

Methods and apparatus for Enhanced IO Interface for PLC program and program-suspend-resume operations. A NAND memory device includes blocks of single-level cell (SLC) memory and multi-level cell (MLC) memory storing n-bits per cell such as quad-level cell (QLC) or penta-level cell (PLC) memory. The NAND memory device further includes a plurality of page buffer latches and logic to copy data from a set of n SLC pages in a block of SLC memory into n respective page buffer latches and copy data from the respective page buffer latches to an MLC page (e.g., QLC or PLC page) in a block of MLC memory. These operations can be extended for NAND memory devices having multiple planes with blocks of SLC and QLC/PLC memory. QLC/PLC program and program-resume operations are supported with optional ECC correction operations.

20 Claims, 16 Drawing Sheets

(58) Field of Classification Search
CPC ....... G11C 7/04; G11C 7/1009; G11C 7/1039;
G11C 7/1069; G11C 7/1096; G11C
11/408; G11C 11/5685; G11C 16/0466;
G11C 16/06; G11C 16/20; G11C 16/22;
G11C 16/24; G11C 16/3427; G11C
16/3454; G11C 2029/1202; G11C 29/025;
G11C 29/42; G11C 7/02; G11C 7/1057
USPC ............. 365/185.22, 185.03, 185.12, 185.18
See application file for complete search history.

| # | Operation | #Of CMD/ADD/DATA Cycles |
|---|---|---|
| 1 | Set Feature 0x87 to select 1st/2nd/3rd-Pass PLC PGM | 6 |
| 2 | SLC Entry | 1 |
| 3 | Copyback Read SLC Page: N | 7 |
| 4 | Copyback Program EP with SLC Page N data | 8 |
| 5 | SLC Entry | 1 |
| 6 | Copyback Read SLC Page: N+1 | 7 |
| 7 | Copyback Program TP with SLC Page N+1 data | 8 |
| 8 | SLC Entry | 1 |
| 9 | Copyback Read SLC Page: N+2 | 7 |
| 10 | Copyback Program XP with SLC Page N+2 data | 8 |
| 11 | SLC Entry | 1 |
| 12 | Copyback Read SLC Page: N+3 | 7 |
| 13 | Copyback Program UP with SLC Page N+3 data | 8 |
| 14 | SLC Entry | 1 |
| 15 | Copyback Read SLC Page: N+4 | 7 |
| 16 | Copyback Program LP with SLC Page N+4 data | 8 |
| Total IO Cycles: | | 86 |

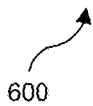

*Fig. 6*

| # | Operation | #Of CMD/ADD/DATA Cycles |
|---|---|---|
| 1 | Read SLC Page: N (EP Page) | 7 |
| 2 | Set Feature 0xD7 to arrange data in SPB | 6 |
| 3 | Read SLC Page: N+1 (TP Page) | 7 |
| 4 | Set Feature 0xD7 to arrange data in SPB | 6 |
| 5 | Read SLC Page: N+2 (XP Page) | 7 |
| 6 | Set Feature 0xD7 to arrange data in SPB | 6 |
| 7 | Read SLC Page: N+3 (UP Page) | 7 |
| 8 | Set Feature 0xD7 to arrange data in SPB | 6 |
| 9 | Set Feature 0x87 to indicate last LP read next | 6 |
| 10 | Read SLC Page: N+4 (IP Page) | 7 |
| 11 | Set Feature 0xD7 to arrange data in SPB | 6 |
| 12 | Program Resume | 7 |
| Total IO Cycles: | | 78 |

*Fig. 7*

| # | Operation | #Of CMD/ADD/DATA Cycles |
|---|---|---|
| 1 | Set Feature 0xF2 to Store SLC Start Page Address | 6 |
| 2 | Set Feature 0xF7 to Store SLC Block Address for each Plane | 6 |
| 3 | Set Feature 0x87 to select 1st/2nd/3rd-Pass PLC PGM, and Enable Enhanced IO Interface | 6 |
| 4 | Program Command with LP page information on PLC Block | 7 |
| Total IO Cycles: | | 25 |

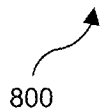

*Fig. 8*

| # | Operation | #Of CMD/ADD/DATA Cycles |
|---|---|---|
| 1 | Set Feature 0xF2 to Store SLC Start Page Address | 6 |
| 2 | Set Feature 0xF7 to Store SLC Block Address for each Plane | 6 |
| 3 | Set Feature 0x87 to select 1st/2nd/3rd-Pass PLC PGM, and Enable Enhanced IO Interface | 6 |
| 4 | Program Resume | 7 |
| Total IO Cycles: | | 25 |

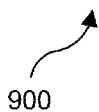

*Fig. 9*

PLC Program Interface with SLC ECC Correction:
1. Read SLC Page: N → ECC Correct and Store it in System TBUF
2. Read SLC Page: N+1 → ECC Correct and Store it in System TBUF
3. Read SLC Page: N+2 → ECC Correct and Store it in System TBUF
4. Read SLC Page: N+3 → ECC Correct and Store it in System TBUF
5. Read SLC Page: N+4 → ECC Correct and Store it in System TBUF
6. Program EP with SLC Page N data
7. Program TP with SLC Page N+1 data
8. Program XP with SLC Page N+2 data
9. Program UP with SLC Page N+3 data
10. Program LP with SLC Page N+4 data

PLC Program-Resume Interface with SLC ECC Correction:
1. Read SLC Page: N → ECC Correct and Store it in System TBUF
2. Read SLC Page: N+1 → ECC Correct and Store it in System TBUF
3. Read SLC Page: N+2 → ECC Correct and Store it in System TBUF
4. Read SLC Page: N+3 → ECC Correct and Store it in System TBUF
5. Read SLC Page: N+4 → ECC Correct and Store it in System TBUF
6. QP program CMD: 80-addr[px]-<DIN_EP>-11-tDBSY
7. Set Feature 0xD7: To arrange Data in corresponding SPB
8. QP program CMD: 80-addr[px]-<DIN_TP>-11-tDBSY
9. Set Feature 0xD7: To arrange Data in corresponding SPB
10. QP program CMD: 80-addr[px]-<DIN_XP>-11-tDBSY
11. Set Feature 0xD7: To arrange Data in corresponding SPB
12. QP program CMD: 80-addr[px]-<DIN_UP>-11-tDBSY
13. Set Feature 0xD7: To arrange Data in corresponding SPB
14. QP program CMD: 80-addr[px]-<DIN_LP>-11-tDBSY
15. Set Feature 0xD7: To arrange Data in corresponding SPB
16. Program Resume

ENHANCED IO INTERFACE FOR PLC PROGRAM AND PROGRAM-SUSPEND-RESUME OPERATIONS

BACKGROUND INFORMATION

NAND memory stores information in blocks comprising arrays of memory cells. Historically, NAND memory devices were single-level cell (SLC) devices, where each cell stores a single bit of information. Today, NAND devices employ may be multi-level cell (MLC) devices, such as triple-level cell (TLC) devices, quad-level cell (QLC) devices, and penta-level cell (PLC) devices. Also, NAND devices may employ combinations of cell types, such as devices that store information using SLC and MCL blocks.

By way of example of an MLC system, a PLC System uses copyback program operations to internally move data from SLC blocks to PLC blocks for optimum system performance. Initiation of targeted PLC program operation requires [1] SLC Entry (1 cycle), [2] Copyback Read on SLC Block (7 cycles), and [3] Copyback Program on PLC Block (8 cycles) command-address sequences for all five (LP, UP, XP, TP, EP) PLC pages. As internally moving all five-page data from SLC block to PLC block requires total of 15 command-address sequences which if decoded further becomes total of 86 cycles, the system performance becomes limited by the command-address-data input cycles required to perform the SLC block to PLC block internal copyback program operation. Additionally, the existing interface adds significant complexity on system hardware/firmware to manage this sequence atomically.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6 is a table listing a sequence of operations performed under a conventional approach to initiate the PLC program operation, along with the number of IO cycles consumed for each operation;

FIG. 7 is a table listing a sequence of operations performed under a conventional approach to initiate the PLC program-resume operation, along with the number of IO cycles consumed for each operation;

FIG. 8 is a table listing the sequence of operations performed to initiate PLC program operation under an embodiment of the enhanced IO interface and program-resume operation with an embodiment of the enhanced IO interface, along with the number of IO cycles consumed for each operation;

FIG. 9 is a table listing the sequence of operations for a program-resume operation under an embodiment of the enhanced IO interface, along with the number of IO cycles consumed for each operation;

FIG. 14 is a listing of operations employed by a PLC program interface with SLC ECC correction, according to one embodiment;

FIG. 15 is a listing of operations employed by a PLC program-resume interface with SLC ECC correction, according to one embodiment;

DETAILED DESCRIPTION

Figure 1:
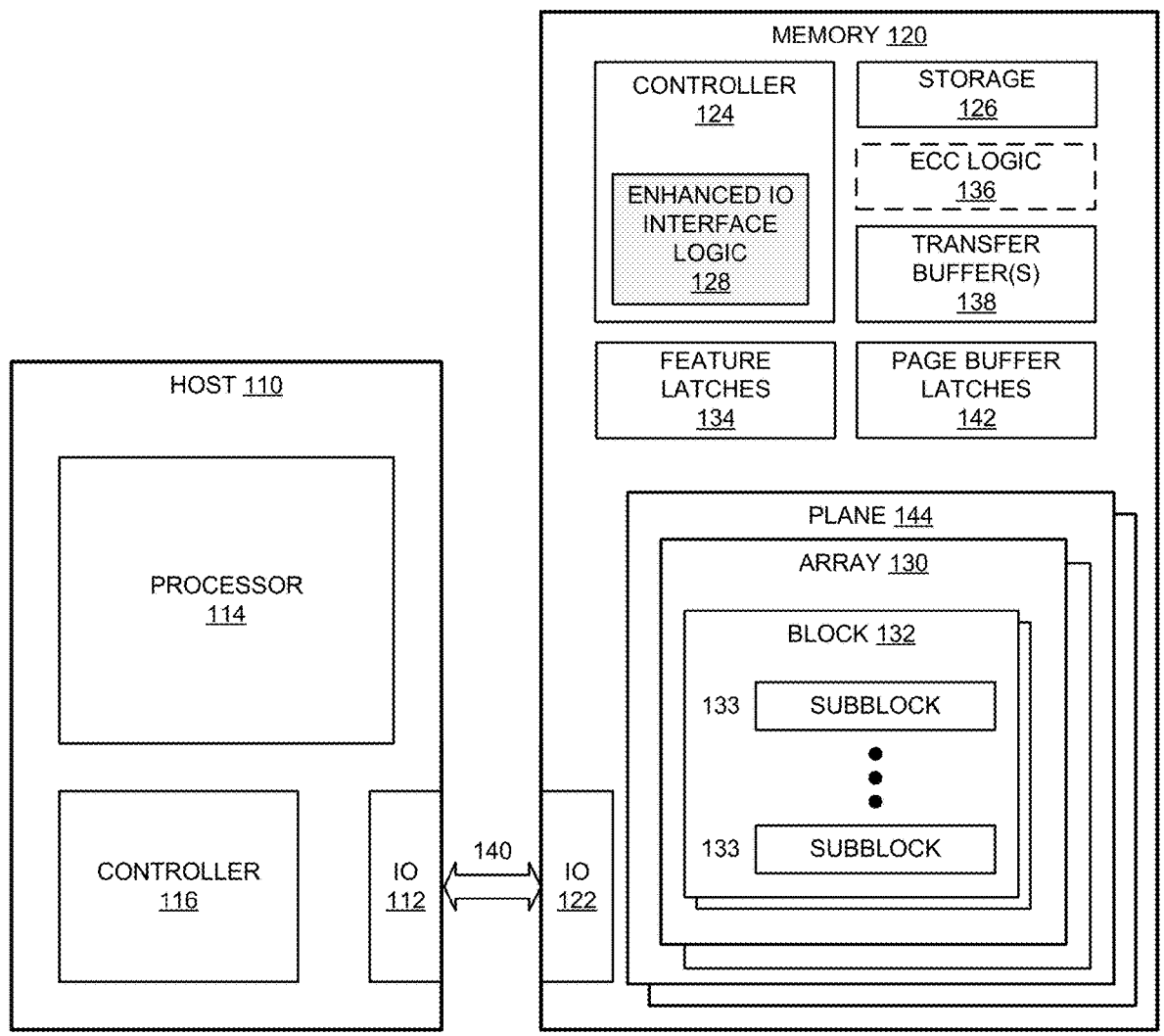
FIG. 1 is a block diagram of an example of a system including a NAND device in which the Enhance IO Interface Mode maybe be implemented, according to one embodiment.

Embodiments of methods and apparatus for Enhanced IO Interface for PLC Program and Program-Suspend-Resume Operations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, an enhanced IO interface is provided that requires 25 command-address-data cycles along with a simplified IO interface to perform the SLC block to PLC block internal copyback operation for all five PLC pages. It also improves the Program-Suspend-Resume IO latency by reducing the number of command-address-data cycles from 78 to 25, in one embodiment.

In one aspect, the enhanced IO interface utilizes two set-feature latches the system uses to store the (1) SLC Start Page Address, and (2) SLC Block Address for Each Plane, and once those feature latches are configured with appropriate Page/Block information, the system enters an Enhance IO Interface Mode by setting a dedicated feature-bit and then issues the program command on the PLC block with LP page addressing.

Once the LP page program command is received on the PLC block while in the Enhance IO Interface Mode, the NAND device internally enters the SLC mode to read out the data from SLC Start Page Address of specified SLC Quad-Plane Blocks and place it on one of the Static Page Buffer (SPB) latches designated for the LP data for PLC, and then keeps incrementing the page-address to read out the next data to place it on SPB latches designated for UP, XP, TP, and EP for PLC. Once all five pages of data are internally pre-read and placed on appropriate SPB latches, the NAND device automatically switches to PLC mode without any system/user interaction and executes the program operation.

The following diagrams illustrate examples of NAND memory devices and systems that may be configured to implement the foregoing functionality. For example, FIG. 1 is a block diagram of an example of a system including a NAND device in which the Enhance IO Interface Mode maybe be implemented. System 100 includes host 110, which represents a control platform for a computing device or computing system. Host 110 can provide a hardware control platform through a host processor and interconnect hardware to connect the host processor to peripherals or other components. Host 110 can provide a software control platform through a host operating system (OS) executing on the host processor, as well as software and firmware modules that provide control for the interconnecting hardware.

In one example, host 110 includes processor 114 as a host processor. Processor 114 represents a processor or processing unit device that generates requests for data on memory 120. In one example, processor 114 represents a central processing unit (CPU), a graphics processing unit (GPU), or other processor that requests access to data in memory 120. In one example, processor 114 is a multicore processing device.

Host 110 includes controller 116, which represents a host controller to control access to memory 120. The access can include read commands to read data from memory 120, and write commands to commit data to memory 120. In one example, controller 116 is part of processor 114. In one example, controller 116 is coupled to processor 114 over a System-on-a-chip (SOC) substrate. In one example, controller 116 is a memory controller that accesses memory 120 over a high speed system memory bus. In one example, controller 116 is a storage controller that accesses memory 120 over a peripheral bus.

Host 110 includes IO (input-output) 112. IO 112 represents hardware interface components to interconnect with memory 120. IO 112 can include drivers, receivers, termination, and other hardware. In one example, IO 112 can be considered to include logic or software/firmware to configure and operate the interconnection hardware.

Bus 140 represents one or more buses to interconnect host 110 to memory 120. In one example, bus 140 includes a point-to-point bus. In one example, bus 140 includes a multidrop bus. Bus 140 can include signal lines to carry a command to memory 120 from controller 116. Bus 140 includes signal lines to carry data between host 110 and memory 120. Memory 120 includes IO 122, which can be comparable to IO 112 of host 110.

Memory 120 includes controller 124, which represents a media controller to control access to the media of array 130. It will be understood that controller 124 on memory 120 is separate from controller 116 of host 110. Controller 116 is a host-side controller that controls access from components of host 110 to memory 120. Controller 124 on memory 120 decodes incoming commands from controller 116 and generates internal operations to execute the commands.

Array 130 represents an array of bitcells or storage cells or memory cells. In one example, array 130 represents a nonvolatile NAND storage media to store data. Array 130 can be written by a program and program verify operation. A nonvolatile media retains state even when power is interrupted to the memory. In contrast, a volatile media becomes indeterminate if power is interrupted to the memory. Array 130 can represent separate memory chips or separate planes of media, such as depicted by planes 144. In one example, memory 120 includes multiple arrays 130. A multiplane memory refers to a memory with multiple independently accessible storage arrays. Thus, the array can be accessed in parallel. In one example, memory 120 has a single plane. In one example, memory 120 has multiple planes, such as two planes or four planes or multiples thereof.

Each array 130 has rows and columns of storage media. In one example, the storage media is a three-dimensional (3D) NAND storage array with the rows and columns also separated into stacks with vertical columns. The vertical architecture can be varied, and a wordline can extend horizontally and vertically.

Each array 130 has multiple blocks 132. A block is a segment of array 130 that is separately addressable by controller 124 or the media controller. In one example, each block 132 includes multiple subblocks 133. The number of blocks in array or arrays 130 can be a binary number, such as 64 blocks, 128 blocks, 256 blocks, 512 blocks, or some other number. The number is not necessarily binary. The number of subblocks in the blocks can be, for example, 8, 16, 24, or some other number.

In one example, memory 120 includes storage 126. In one example, storage 126 is part of controller 124. In one example, storage 126 is a register device. In one example, storage 126 is an SRAM (Synchronous Random Access Memory) device. In one example, controller 124 executes firmware or software to perform the program operations, including storing computed parameters in storage 126 and applying the stored parameters to other subblocks.

In one example, memory 120 includes at least two different arrays 130 with at least two different media types. For example, memory 120 can include one or more arrays 130 of SLC NAND as a cache for a PLC NAND primary storage. As another example, memory 120 can include one or more arrays 130 of SLC NAND as a cache for a QLC NAND primary storage. In one example, there will be a number of SLC arrays to match the primary storage. For example, memory 120 can include a PLC primary array and three or some multiple of three of SLC arrays. As another example, memory 120 can include a QLC primary array and four or some multiple of four of SLC arrays.

Controller 124 further includes enhanced IO interface logic 128 that is used to implement the enhanced IO interface mode described and illustrated herein. Memory 120 further includes feature latches 134, optional Error Correction Code (ECC) logic 136 (which may be present in some embodiments but others), one or more transfer buffers 138, and one or more sets of page buffer latches 142. Generally, feature latches 134 and page buffer latches 142 may be part of storage 126 or may be implemented as separate sets of latches, such as shown in FIG. 1. Similarly, enhanced IO interface logic may be part of controller 124, or may be implemented in a separate block of logic/circuitry.

Figure 2:
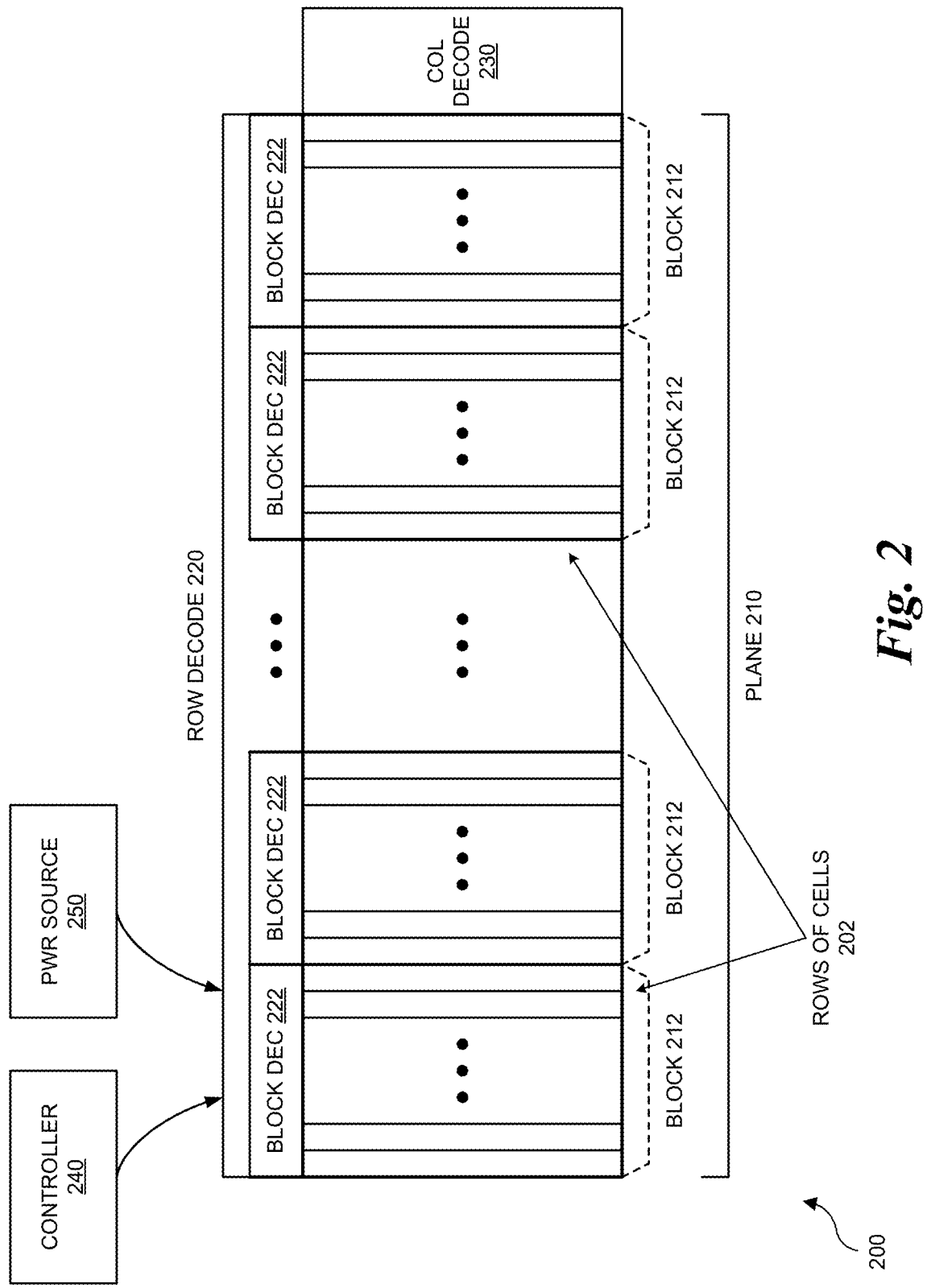
FIG. 2 is a block diagram of an example of a memory architecture subdivided into array blocks, according to one embodiment.

FIG. 2 is a block diagram of an example of a memory architecture subdivided into array blocks that can apply stored program parameters. Memory 200 illustrates components of a memory device with a specific mapping of IO to portions of the memory array, which can be a memory array in accordance with system 100. In one example, memory 200 represents memory elements that are part of a solid-state drive (SSD) that stores data in nonvolatile bitcells. Memory 200 selectively connects the IO to specific cells with decoder circuitry, which enables access to specific cells.

Memory 200 includes one or more planes 210, which includes multiple rows of cells 202. The vertical rectangles of the diagram represent the rows. In one example, plane 210 is organized as multiple blocks 212. It will be understood that the expression "plane" is used as an example, and other terminology could be used for a memory device or storage device to refer to the array of cells used to store data. Block 212 can refer to a group of rows of cells 202.

An access command (either a read command or a write/program command) triggers command signal lines that are interpreted by row decode logic 220 to select a row or rows for the operation. In one example, row decode logic 220 includes block decode logic 222 to select a specific block 212 of plane 210. Block decode (DEC) 222 can represent another level of decoding logic, which can be in addition to row decode 220 or can simply be a specific type of row decode 220. Block decode 222 can provide specific access to subblocks of memory within the block (not specifically represented in the drawing).

Memory 200 includes column decode logic 230 to select a column of data, where signal lines from specific blocks or subblocks can be connected to sense amplifiers to allow the routing of data between the storage cells and IO (not specifically shown). The IO can include local IO and global IO. Local IO can refer to the routing circuitry to transfer data of specific blocks 212. Global IO can refer to the routing circuitry that couples the local IO to the external IO connectors of memory 200.

In one example, decoders of row decode 220 or block decode 222 or both apply program parameters to write data to selected cells. In one example, block decode 222 is or includes a block driver as part of the decoder circuitry. The block driver can be an access device controlled to program selected cells. In one example, controller 240 provides control signals to cause specific decode logic to apply program signals to specific blocks and subblocks of memory 200 to perform a program operation. Power (PWR) source 250 represents a power source that provides power to program the cells of memory 200.

Figure 3:
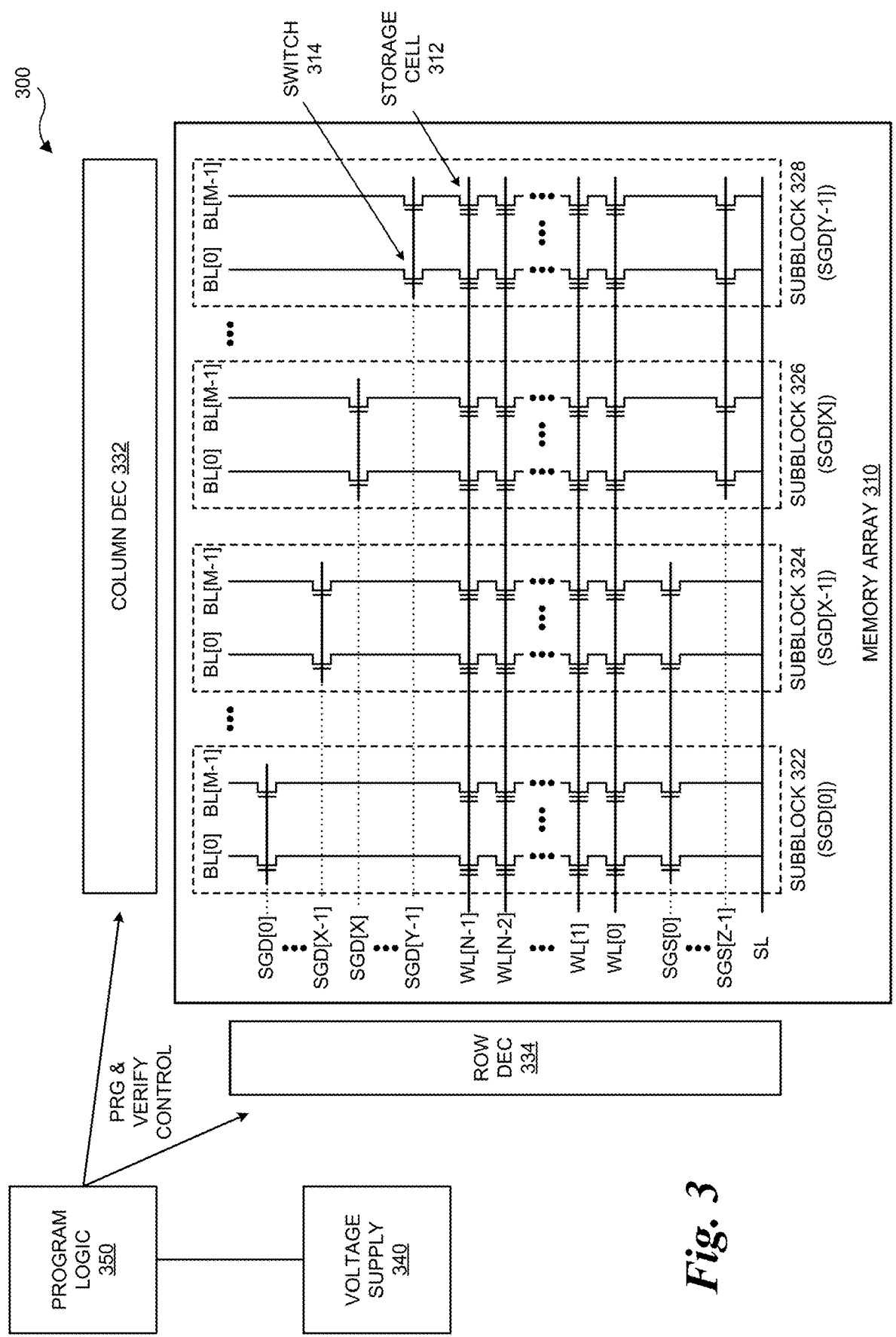
FIG. 3 is a block diagram of an example of a system having a memory device with a subblock architecture, according to one embodiment.

FIG. 3 is a block diagram of an example of a system having a memory device with a subblock architecture. System 300 represents a storage device in which an enhanced IO interface and mode may be implemented, such as memory 120 of system 100. In one example, system is or is included in a solid state drive (SSD). System 300 can be integrated into a computing device.

System 300 includes memory array 310. In one example, memory array 310 represents a 3D NAND storage device. In one example, memory array 310 represents a 3D stacked memory device. Storage cells 312 represent NV storage cells. In one example, the storage cells 312 represent NAND storage cells. In one example, memory array 310 is an SLC array.

Memory array 310 includes N wordlines (WL[0] to WL[N−1]). N can be, for example, 32, 48, 64, or some other number. In one example, memory array 310 is segmented into subblocks. Subblocks 322, 324, 326, and 328 are illustrated, but are only to be understood as illustrative and not limiting. Segmentation of the memory array into different subblocks can include segmenting into any number of subblocks.

In one example, a subblock refers to the columns, pillars, or strings of storage cells 312 that are accessed together. The pillars or vertical channels can be accessed to together by responding to a common switching signal. The switching signal can refer to gating control for the pillar. For example, the various pillars can be controlled by select gate drain (SGD) signal lines and select gate source (SGS) signal lines. Switches 314 represent the switching elements that can selectively apply the SGD and SGS signaling. An SGD signal line selectively couples a column to a bitline (BL). An SGS signal line selectively couples a column to a source line (SL). The source line (SL) can be a source layer of material integrated onto a semiconductor substrate.

In one example, each subblock includes M bitlines (BL[0] to BL[M−1]). In one example, each storage cell 312 within memory array 310 is addressed or selected by asserting a wordline and a bitline, in conjunction with enabling the column with the gate select switches 314 (shown only on SGD, but SGS switches can be considered included in the control).

As illustrated, memory array 310 includes SGD[0] to control selection of columns in subblock 322, SGD[X−1] to control selection of columns in subblock 324, SGD[X] to control selection of columns in subblock 326, and SGD[Y−1] to control selection of columns in subblock 328. In one example, multiple subblocks share a common source selection. Thus, for the Y SGD signal line illustrated, there are only Z SGS signal lines (SGS [0] to SGS[Z−1]), where Z is understood to be less than Y. In one example, memory array 310 includes the same number of SGS signal lines as SGD signal lines. In the illustrated embodiment, SGD is segmented to provide separate control for the different subblocks, with one SGD segment per subblock. Likewise, SGS is segmented, with one SGS segment providing control for multiple subblocks.

System 300 includes column decode circuitry (column DEC) 332 as a column address decoder to determine from a received command which bitline or bitlines to assert for a particular command. Row decode circuitry (row DEC) 334 represents a row address decoder to determine from a received command which wordline or wordlines to assert for the command.

Power for system 300 is received from voltage supply 340. Voltage supply 340 represents one or more voltage sources or voltage levels generated within system 300 to power electronic components of an electronic device, which can include system 300. Voltage supply 340 can generate different voltage levels, either as multiple voltage levels from a single voltage supply, or different voltage levels from different voltage supplies. Voltage supply 340 can generate multiple program voltages.

System 300 includes circuitry to apply different voltage levels to different layers of the column stack. In one example, column decode 332 and row decode circuitry 334 provide circuitry to apply the various voltages to the various columns and layers of the stack. System 300 can include other circuitry to apply the voltages to the different signal lines or layers of the stack. For example, system 300 can apply high or low voltage levels to the select lines (e.g., SGS, SGD) or to various WLs, or to a combination of wordlines and select lines. The application of the voltages to the select lines can determine whether the switches are open or closed, thus selectively deselecting (open switches) or selecting (closed switches) the columns. The application of voltage to the WLs can determine whether the individual storage cells 312 receive charge, provide charge, or are shut off from the charge.

In one example, system 300 includes program logic 350 coupled to voltage supply 340. Program logic 350 represents logic executed by a media controller or controller of the memory device to program storage cells 312.

Figure 4:
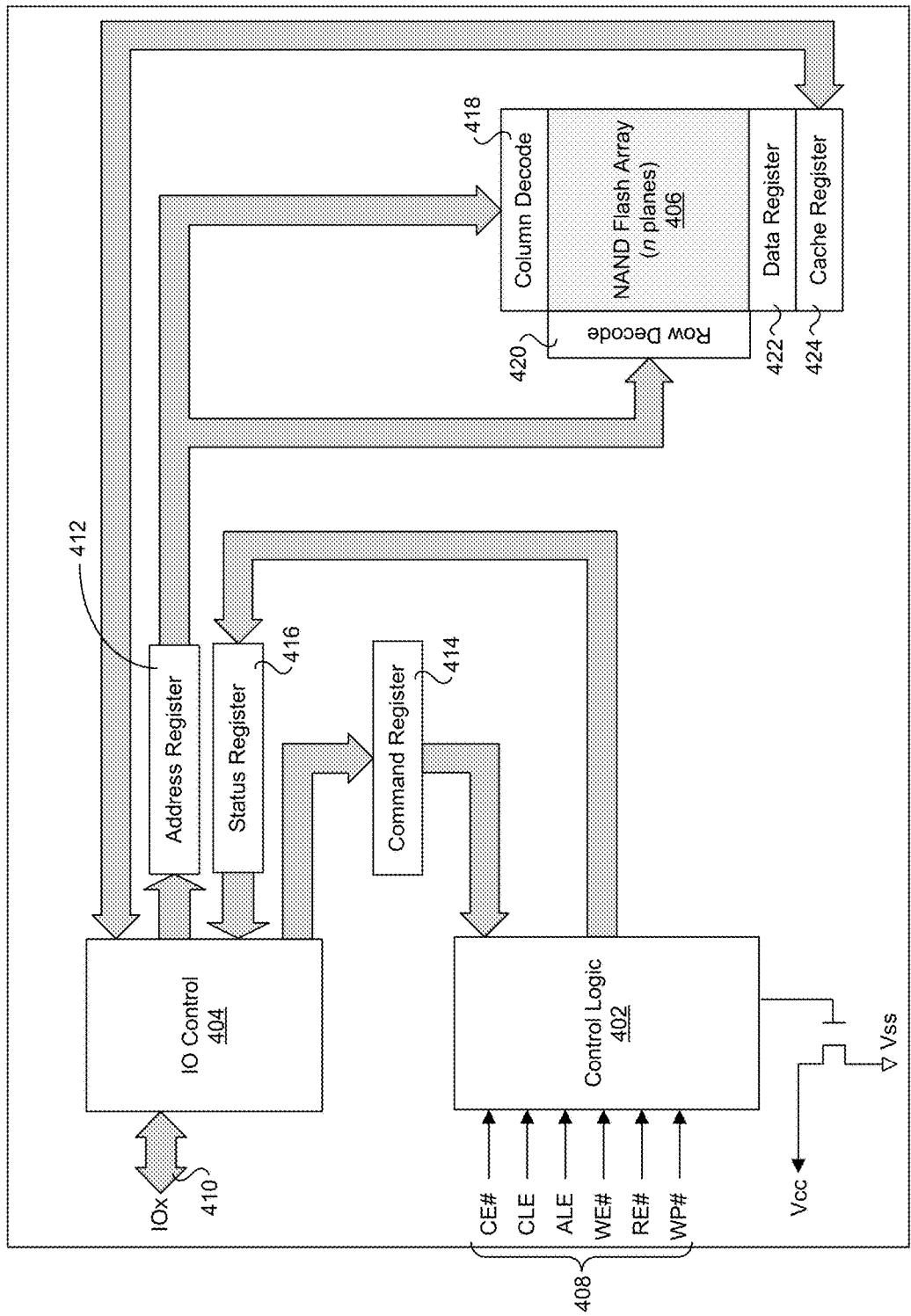
FIG. 4 is a diagram illustrating selective aspects of a memory device, according to one embodiment.

FIG. 4 shows a memory device 400 that includes control logic 402, IO control 404, and one or more planes (n) of NAND flash array (e.g., NAND memory 406). Control logic 402 receives various control inputs 408, while IO control 404 receives and returns various IO signals 410; both control inputs 408 and IO signals 410 are transmitted over an applicable interconnect structure coupled via an IO interface (not shown) to a mating IO interface on a host or the like (also not shown). Column and row address information are stored in an address register 412, while commands are stored in a command register 414. A status register 416 is used to store status information. The column and row address information is provided to column and row decode logic and circuitry 418 and 420. A data register 422 is used to store data, which also may be cached in a cache register 424.

Figure 5:
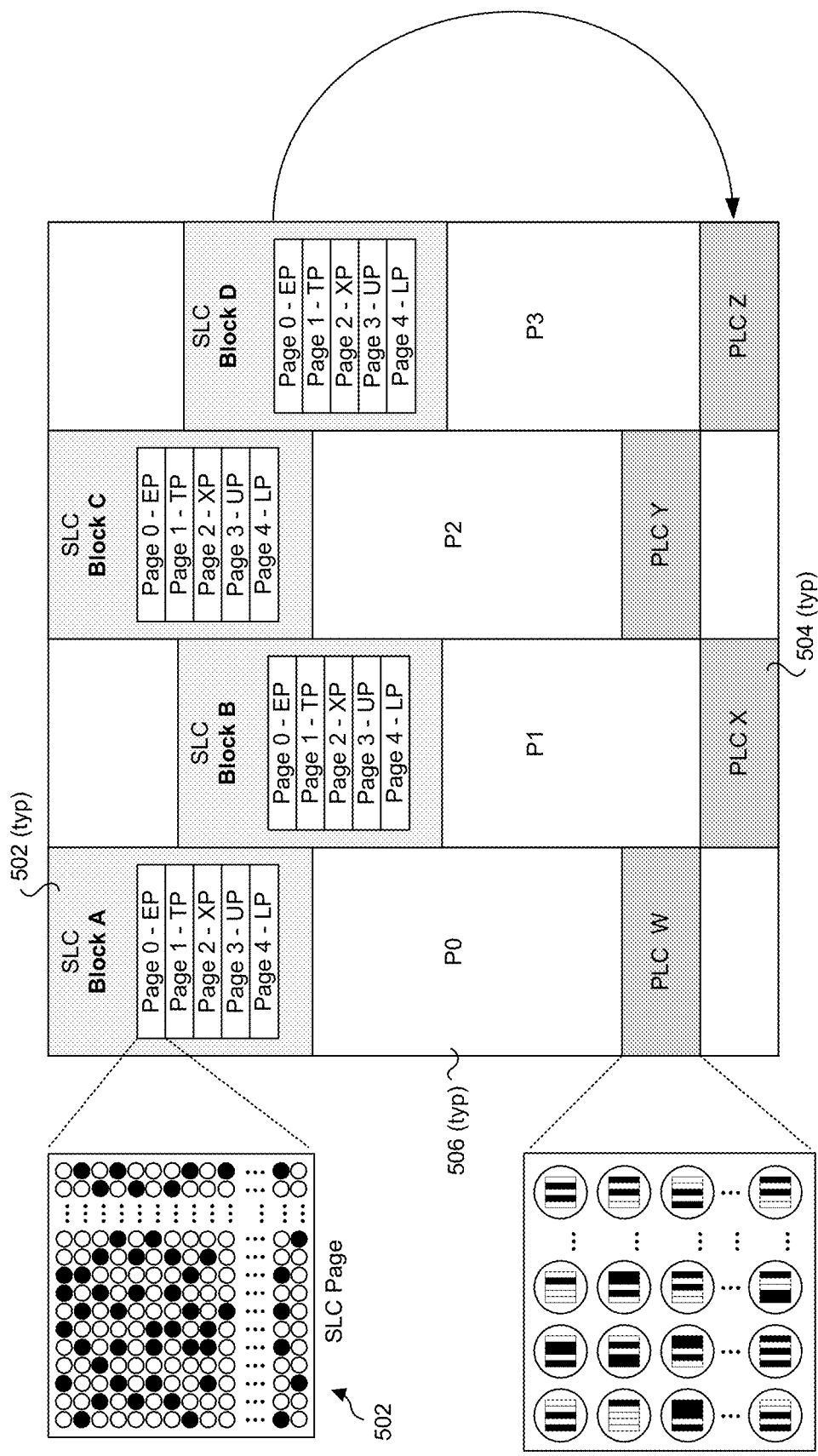
FIG. 5 is a diagram of a PLC System illustrating use of copyback program operations to internally move data from SLC blocks to PLC blocks under an existing approach.

A PLC System uses copyback program operations to internally move data from SLC blocks to PLC blocks for optimum system performance where a sequence of operations is performed to move five pages of SLC page data into one-page of PLC page data as shown in FIG. 5. NAND device 500 includes blocks 502 of SLC page data (Block A, Block B, Block C, and Block D) and PLC blocks 504 (PLC W, PLC X, PLC Y, PLC Z) on planes 506 (P0, P1, P2, and P3). In the examples herein, the five SLC pages are called, 'LP' (Page0), 'UP' (Page1), 'XP' (Page 2), 'TP' (Page 3) and 'EP' (Page 4).

An SLC page comprises a subarray of SLCs in a single wordline layer, in one embodiment. Other SLC page schemes may also be used, with the particular scheme for storing an SLC page being outside the scope of this disclosure. As discussed above, each SLC is used to store a single bit of data. In the examples illustrated herein, a black circle represents a bit value of '1', while a circle filled in white represents a bit value of '0', recognizing these color-bit values may be flipped.

As also discussed above, a PLC is a memory cell that stores 5 bits of data. Thus, a single PLC may store 32 different values. For illustrative purposes, the larger circles encompassing five smaller black or white circles depicted PLCs. Like SLCs, a page of PLC comprises a subarray of PLCs, while in one embodiment are on a common wordline layer. A primary difference between an SLC page and a PLC page is a PLC page stores five times as much data for the same number of memory cells.

Operations performed under a conventional approach to initiate the PLC program operation along with the number of CMD/ADD/Data (i.e., input-output (IO)) cycles are shown in Table 600 of FIG. 6. As shown in Table 600, it requires total of 86 IO cycles to initiate one PLC program operation and the same steps with a different Feature-87h settings must be repeated to complete the $1^{st}$-Pass and $2^{nd}$-Pass PLC program operations. Similarly, Table 700 in FIG. 7 shows the steps performed to initiate the PLC program-resume operation, which takes a total of 78 IO cycles. In the examples herein, the particular Feature hexadecimal numbers are merely illustrative and non-limiting.

As shown in Table 600, each Copyback Read SLC Page operation page read consumes 7 IO cycles, while each Copyback Program (EP, TP, XP, UP, LP) with SLC Page (N . . . N+4) data consumes 8 IO cycles. In both cases, respective pairs of operations are performed for each SLC Page.

Table 800 and Table 900 in FIGS. 8 and 9 show the sequence of operations required to initiate PLC program operation and program-resume operation with an embodiment of the enhanced IO interface, which only takes 25 IO cycles per program or program-resume operation and improves IO overhead for program operations by 67-71%.

The enhanced IO interface system uses Feature 0xF2 and Feature 0xF7 SPB latches to store (1) the SLC Start Page Address, and (2) the SLC Block Address for Each Plane, and once those feature latches are configured with appropriate Page/Block information, the system enters the Enhance IO Interface Mode by setting Feature 0x87 Parameter 1 bit7 to 0x1, which selects a $1^{st}/2^{nd}/3^{rd}$-Pass PLC PGM (program) used to program PLC memory cells, followed by the program command on PLC block with EP page addressing. Once the EP page program command is received on the PLC block while in Enhance IO Interface Mode, the NAND device internally enters the SLC mode to read out the data from SLC Start Page Address of the specified SLC Quad-Plane Blocks and place it on one of the SPB latches designated for the EP data for PLC, and then keeps incrementing the page-address to read out the next data to place it on SPB latches designated for TP, XP, UP and LP for PLC. Once all five pages of data are internally pre-read and placed on appropriate SPB latches, NAND switches to PLC mode and executes the program operation. This approach should ensure the SLC page address of LP to EP is in sequential order, and provides LP page information in Feature 0xF2, and all four plane's block information in Feature 0xF7.

Figure 10:
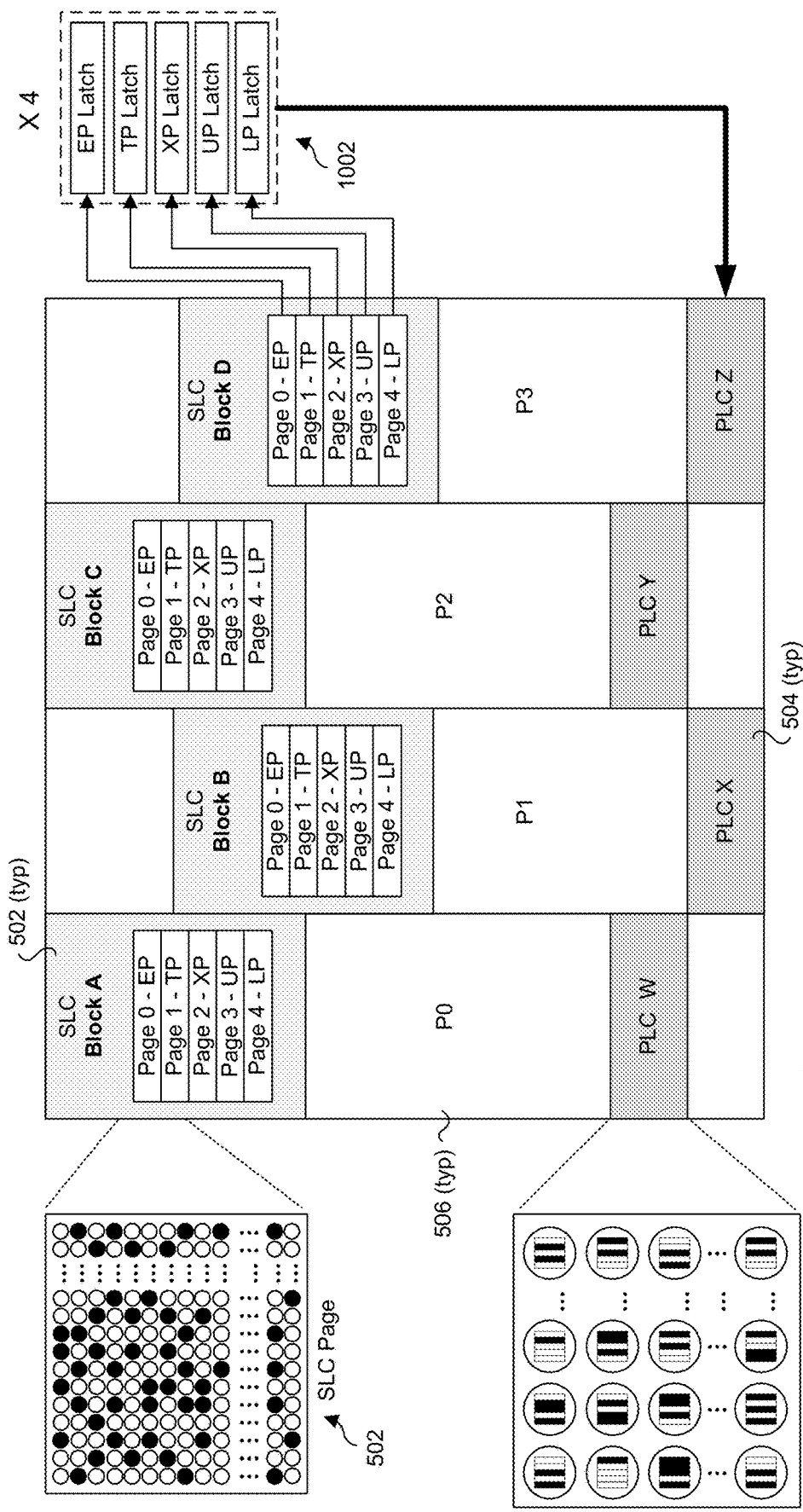
FIG. 10 is a diagram of a PLC System illustrating how data is moved from SLC blocks to PLC blocks using an enhanced IO interface mode.

The foregoing operations are schematically illustrated in FIG. 10, which shows a NAND device 1000 that is similar to NAND device 500 while further depicting a set of SPB latches 1002. For a multi-plane NAND device, there may be a respective set of SPB latches 1002 per plane, e.g., a quad-plane NAND device such as illustrated would include four sets of SPB latches, as depicted by "X 4". In this example, SLC page data from Pages 0 . . . 4 are copied into respective SPB latches LP, UP, XP, TP, and EP. Once all five pages of data are internally pre-read and placed on appropriate SPB latches, these data are copied to an applicable PLC block using the PLC LP page address. In this example, five pages of SLC data in SLC Block D are copied to PLC Block Z in plane P3. In parallel, five pages of SLC data in SLC Block A would be copied to PLC Block W in plane P0, five pages of SLC data in SLC Block B would be copied to PLC Block X in plane P1, and five pages of SLC data in SLC Block C would be copied to PLC Block Y in plane P2.

Figure 11:
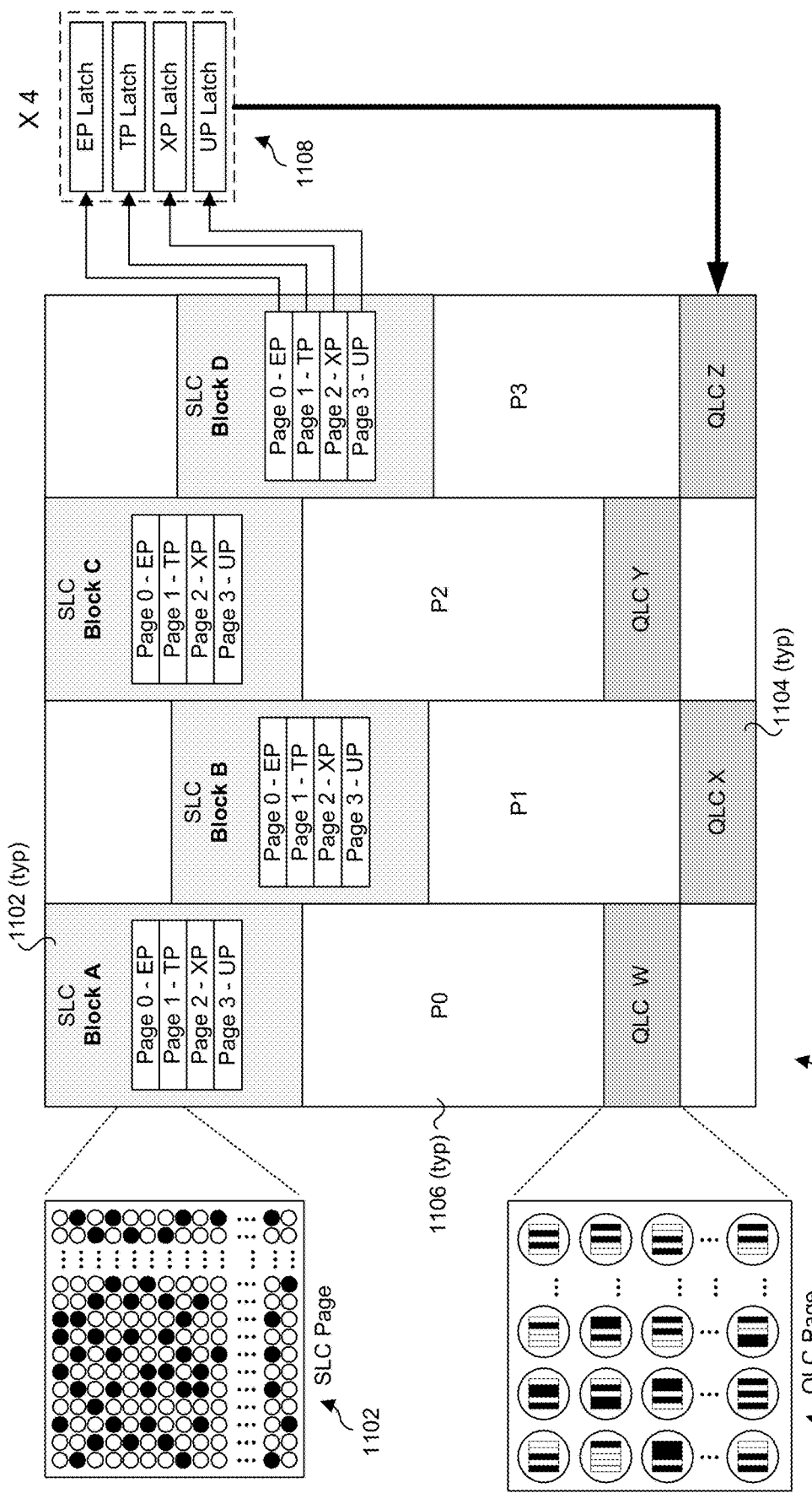
FIG. 11 is a diagram of a QLC System illustrating how data is moved from SLC blocks to QLC blocks using an enhanced IO interface mode.

As shown in FIG. 11, a similar scheme may be implemented for a NAND device 1100 that includes SLC blocks 1102 including SLC pages EP, TP, XP, and UP and QLC blocks 1104 for each of four planes 1106 (P0, P1, P2, and P3). The scheme is similar to that shown for NAND device 1000 in FIG. 10, except for a QLC block for pages of SLC pages are copied to each QLC block rather than five. This is facilitated, in part, by four sets of SPB latches 1108. It is further noted that the third operation (#3) in the Program and Program-Resume operations in Tables 800 and 900 of FIGS. 8 and 9 would select a QLC program (PGM) rather than a $1^{st}/2^{nd}/3^{rd}$-Pass PLC PGM.

Copy SLC to PLC with ECC Correction

The Enhanced IO Interface should only be used for the operations where no ECC correction is needed on the SLC block data, and for the cases where ECC correction is required on the SLC block data, the system should keep the Enhanced IO interface disabled and utilize a System Transfer Buffer (TBUF) and associated sequences for Program and Program-Resume operations.

Figure 12A:
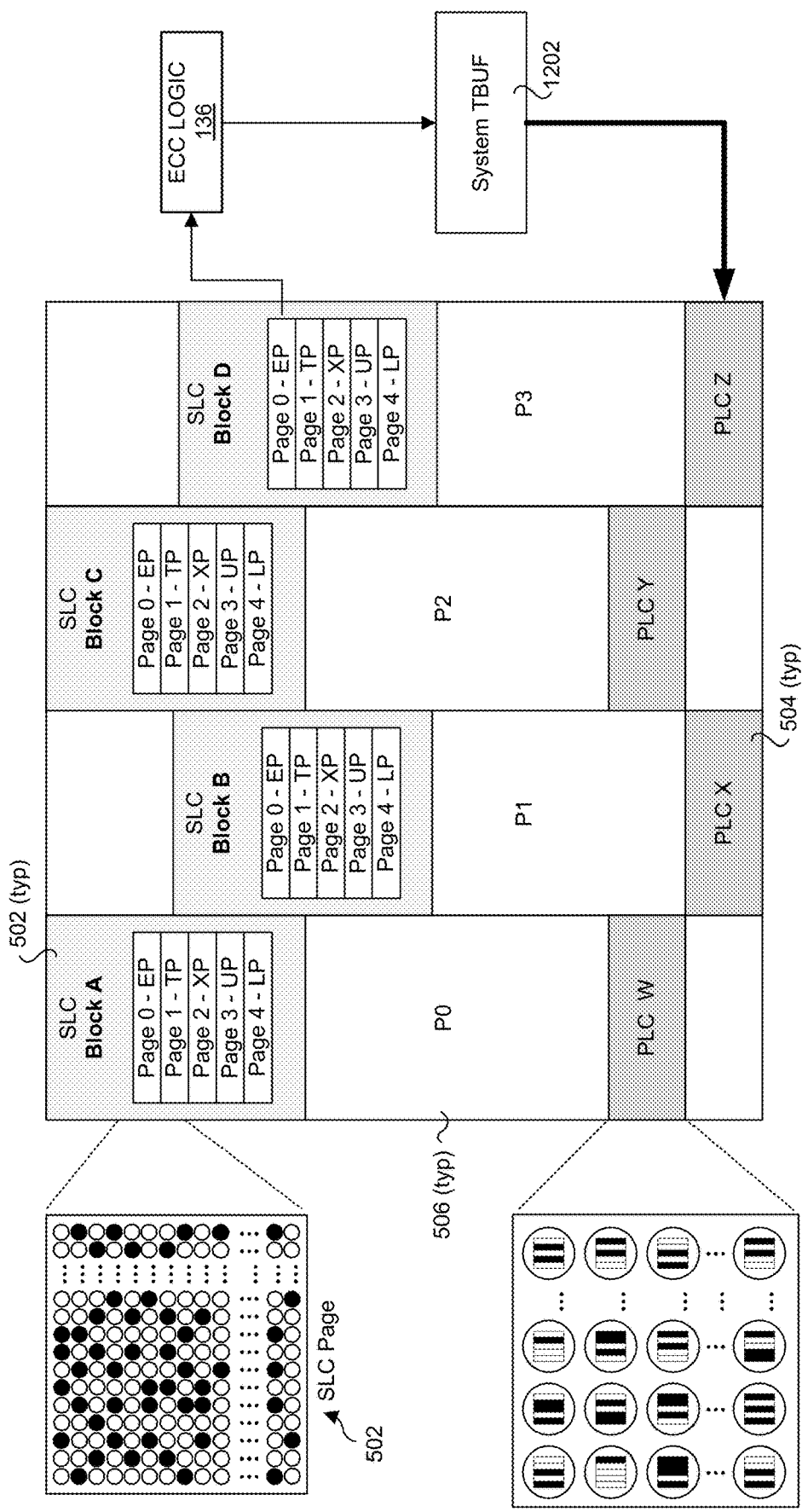
FIG. 12a is a diagram illustrating how data is moved from SLC block to PLC blocks combined with ECC operations, according to a first embodiment.
Figure 12B:
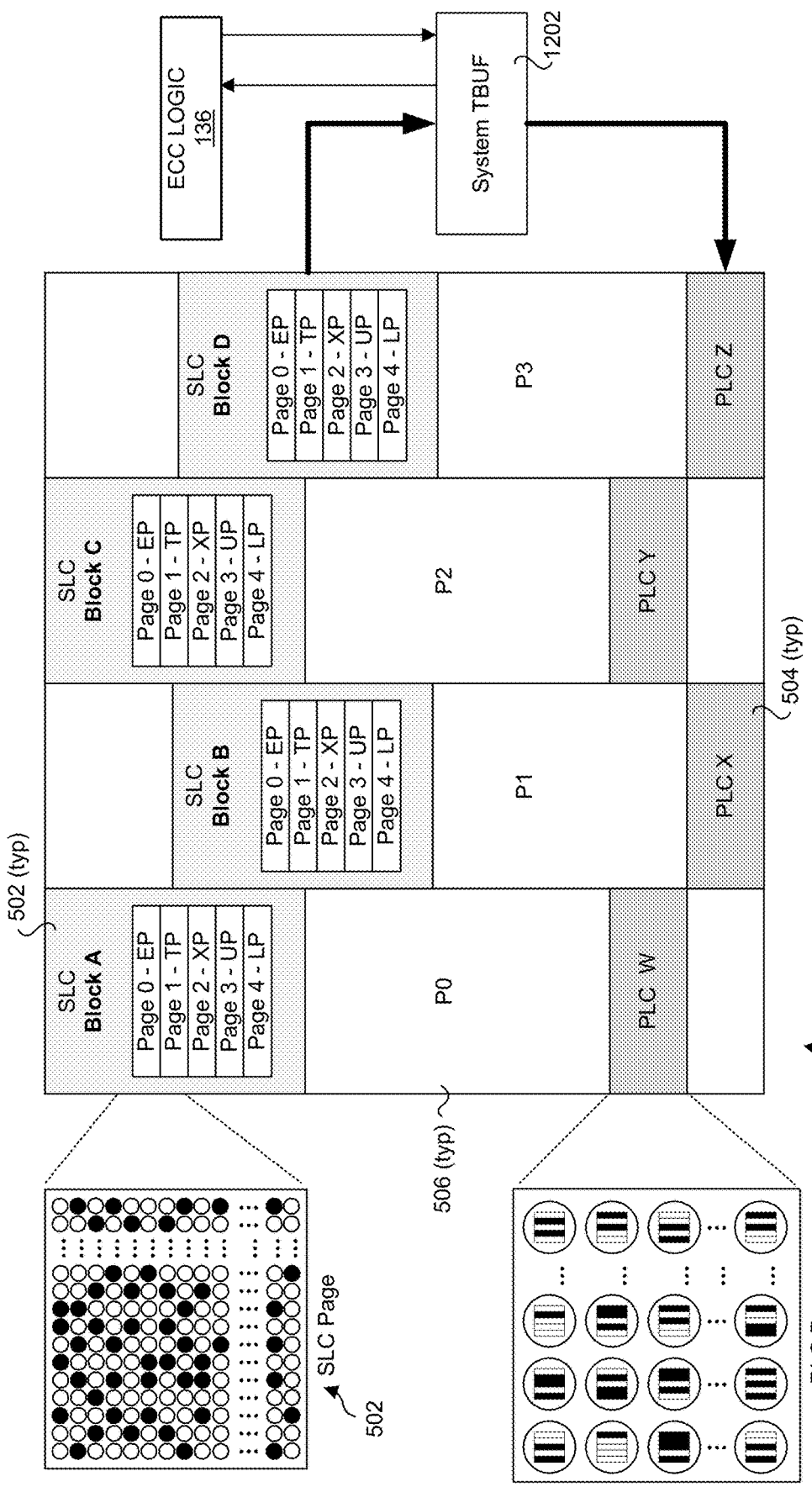
FIG. 12b is a diagram illustrating how data is moved from SLC block to PLC blocks combined with ECC operations, according to a second embodiment.

Examples of NAND devices 1200a and 1200b configured to implement PLC Program operations with ECC correction are shown in FIGS. 12a and 12b. Under the approach illustrated in FIG. 12a, data from SLC pages 0-4 are read from an SLC block and processed by ECC logic 136 to perform ECC operations prior to writing the data to a system TBUF 1202. When page data from all five SLC pages 0-4 are buffered in system TBUF 1202 the data are copied to a PLC page. Corresponding operations are shown in operation sequence 1400 of FIG. 14. Under operations 1-5 the five SLC pages (shows as N . . . N+4) are read, ECC correction is performed by ECC logic 136, and the data are stored in system TBUF 1202.

Under the alternative scheme shown in FIG. 12b, the five SLC pages are read and copied to system TBUF 1202 and ECC logic 136 reads the data from system TBUF 1202 and only writes back data that is changed due to ECC correction. The system TBUF storage and ECC correction operations may be performed in parallel once the first portion of SLC page data is copied to system TBUF 1202.

Figure 13A:
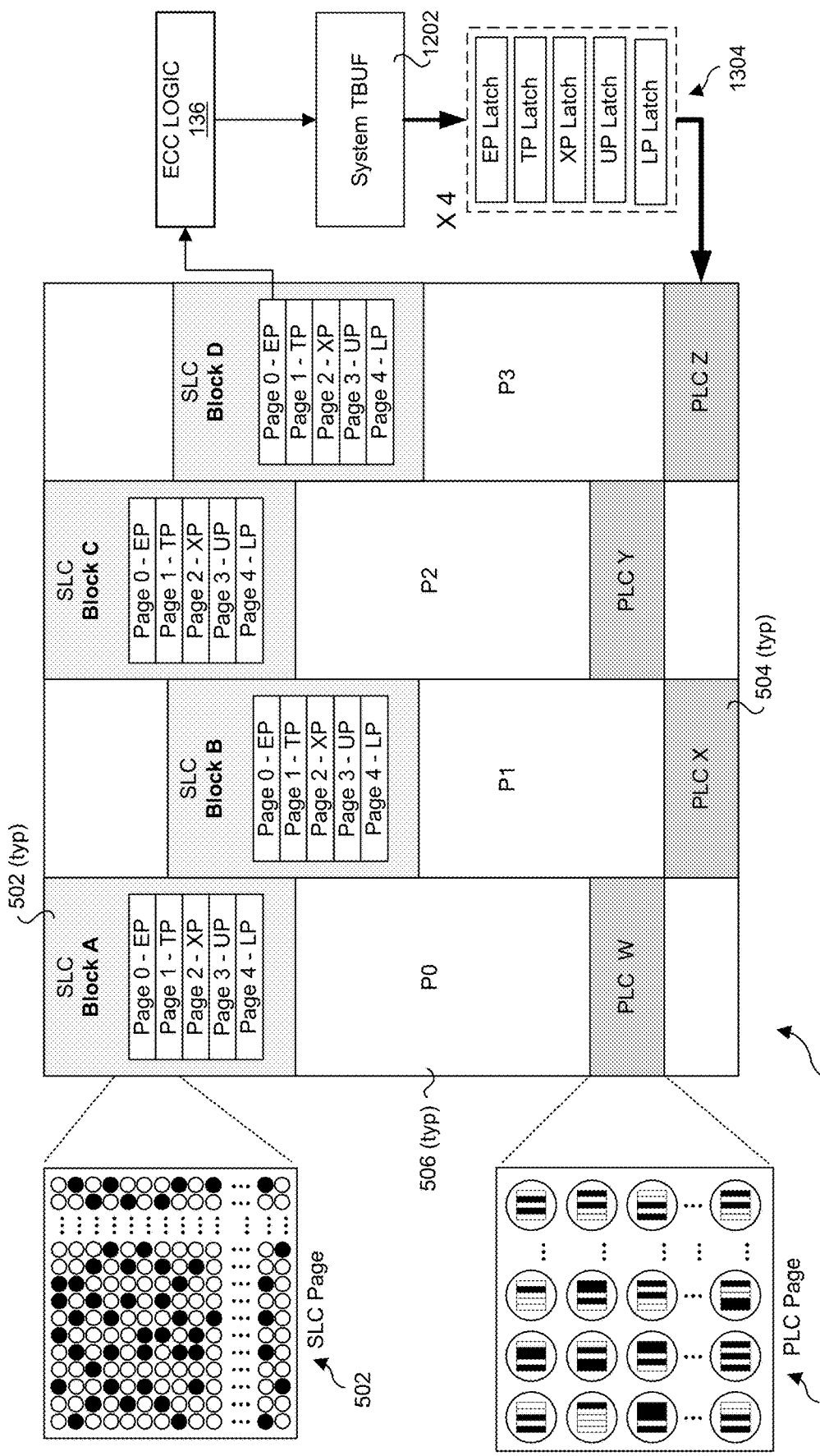
FIG. 13a is a diagram illustrating a Program-Resume operation combined with ECC operations, according to a first embodiment.
Figure 13B:
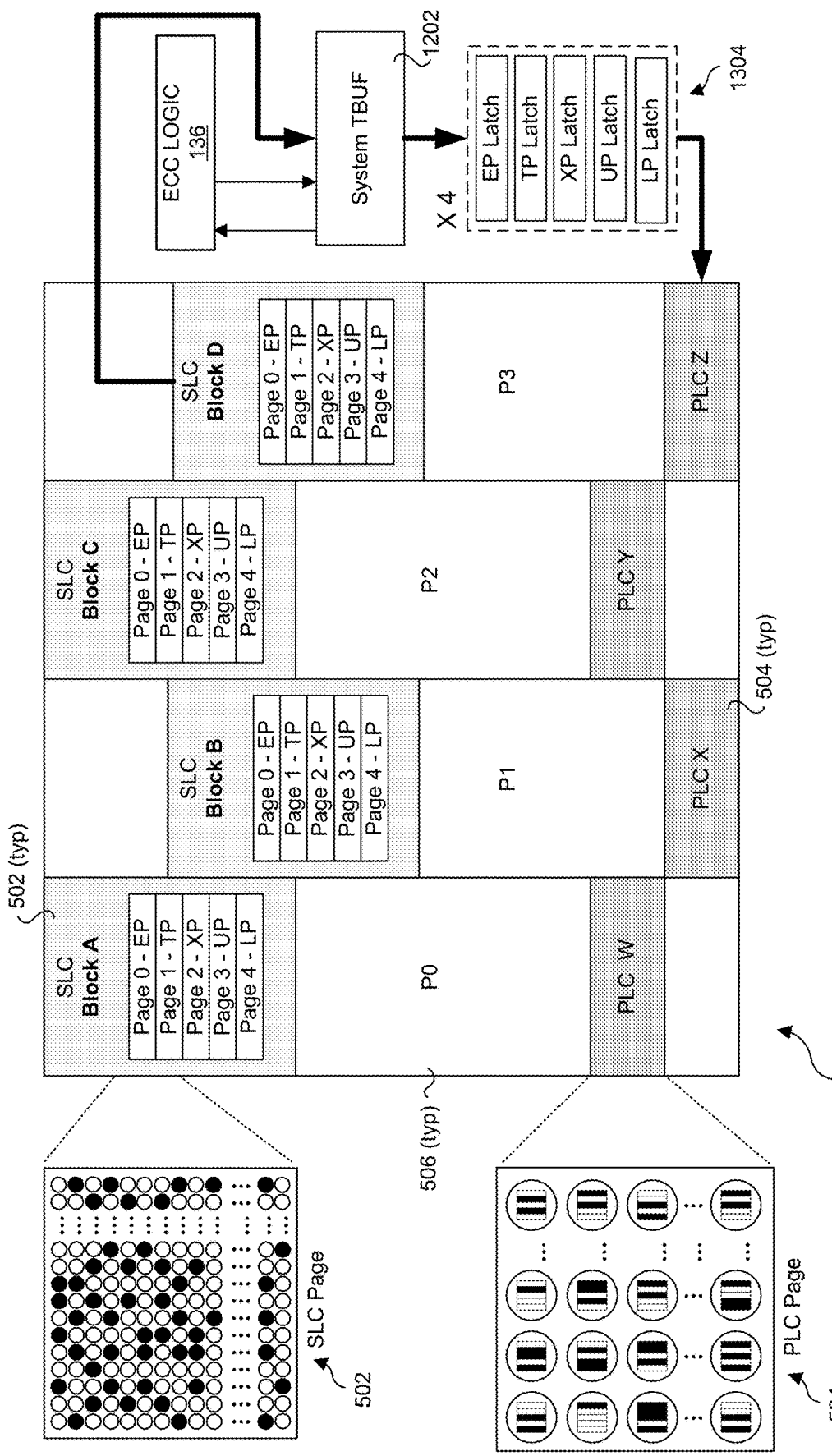
FIG. 13b is a diagram illustrating a Program-Resume operation combined with ECC operations, according to a second embodiment.

FIGS. 13a and 13b respectively shown NAND devices 1300a and 1300b that are configured to support PLC Program-Resume operations with ECC correction. With further reference to operation sequence 1500 in FIG. 15, under the approach shown in FIG. 13a the first five operations (1-5) are the same as above for NAND device 1200a and operation sequence 1400. Operations 6-15 are used to program CMD: 80 to arrange data from SLC pages EP, TP, XP, UP, and LP into respective SPB latches in the 4 sets of SPB latches 1304. As above, for a quad-plane (QP) system, the operations for applicable SLC and PLC blocks are performed in parallel for the four planes. In operation 16, programming of the PLC blocks is resumed. The sequence of operations for NAND device 1300b is substantially similar, except the data are initially read from SLC pages and copied to system TBUF 1202 prior to ECC correction operations in a manner similar to that shown in FIG. 12b and described above. Operations 6-16 are the same for both NAND 1300a and 1300b.

Figure 16A:
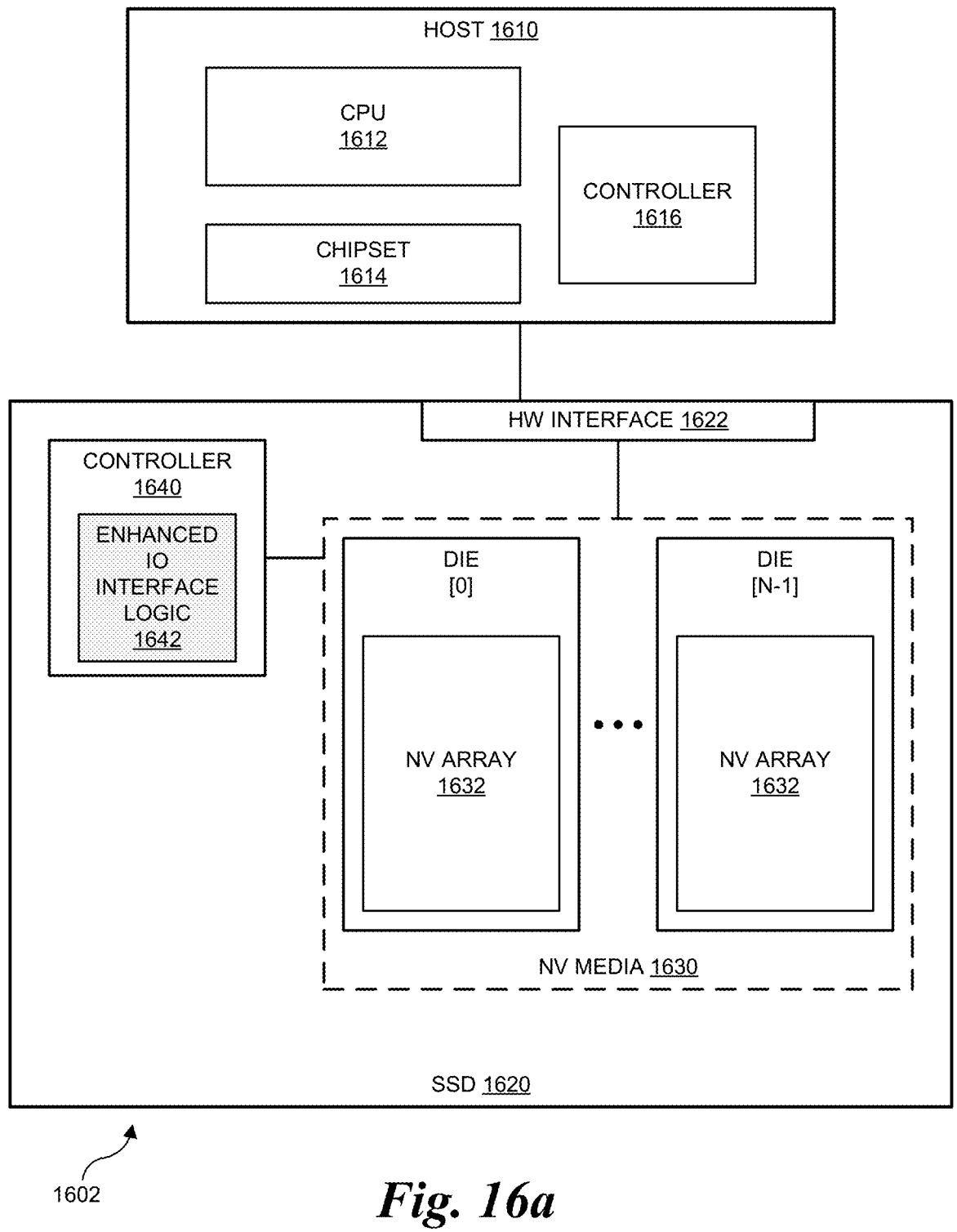
FIG. 16a is a block diagram of an example of a system with a hardware view of a solid-state drive (SSD) in which aspects of the embodiments disclosed herein may be implemented.

FIG. 16a is a block diagram of an example of a system with a hardware view of a solid state drive (SSD) having NAND memory configured in accordance with one or more of the embodiments described above, including but not limited to system 100. System 1602 includes SSD 1620 coupled with host 1610. Host 1610 represents a host hardware platform that connects to SSD 1620. Host 1610 includes CPU (central processing unit) 1612 or other processor as a host processor or host processor device. CPU 1612 represents any host processor that generates requests to access data stored on SSD 1620, either to read the data or to write data to the storage. Such a processor can include a single or multicore processor, a primary processor for a computing device, a graphics processor, a peripheral processor, or a supplemental or auxiliary processor, or a combination. CPU 1612 can execute a host OS and other applications to cause the operation of system 1602.

Host 1610 includes chipset 1614, which represents hardware components that can be included in connecting between CPU 1612 and SSD 1620. For example, chipset 1614 can include interconnect circuits and logic to enable access to SSD 1620. Thus, host 1610 can include a hardware platform drive interconnect to couple SSD 1620 to host 1610. Host 1610 includes hardware to interconnect to the SSD. Likewise, SSD 1620 includes corresponding hardware to interconnect to host 1610.

Host 1610 includes controller 1616, which represents a storage controller or memory controller on the host side to control access to SSD 1620. In one example, controller 1616 is included in chipset 1614. In one example, controller 1616 is included in CPU 1612. Controller 1616 can be referred to as an NV memory controller to enable host 1610 to schedule and organize commands to SSD 1620 to read and write data.

SSD 1620 represents a solid-state drive or other storage system or module that includes nonvolatile (NV) media 1630 to store data. SSD 1620 includes HW (hardware) interface 1622, which represents hardware components to interface with host 1610. For example, HW interface 1622 can interface with one or more buses to implement a high-speed interface standard such as NVMe (nonvolatile memory express) or PCIe (peripheral component interconnect express).

In one example, SSD 1620 includes NV (nonvolatile) media 1630 as the primary storage for SSD 1620. In one example, NV media 1630 is or includes a block addressable memory technology, such as NAND. In one example, NV media 1630 is implemented as multiple dies, illustrated as N dies, Die[0: {N−1}]. N can be any number of devices, and is often a binary number. SSD 1620 includes controller 1640 to control access to NV media 1630. Controller 1640 represents hardware and control logic within SSD 1620 to execute control over the media. Controller 1640 is internal to the nonvolatile storage device or module, and is separate from controller 1616 of host 1610.

The NV dies of NV media 1630 include NV array 1632, which can include stacks of planar arrays, a three-dimensional (3D) array, or a traditional two-dimensional array. In one example, NV media 1630 includes a multiplane storage, such as double plane, triple plane, or quad plane array. In one example, NV media 1630 includes a single-plane array. In one example, NV media 1630 includes different media types, such as an SLC portion and an MLC portion. NV array 1632 is divided into blocks and subblocks.

In one example, controller 1640 includes enhanced IO interface logic 1642. In one example, SSD 1620 further includes the components and logic shown for memory 120 in FIG. 1.

Figure 16B:
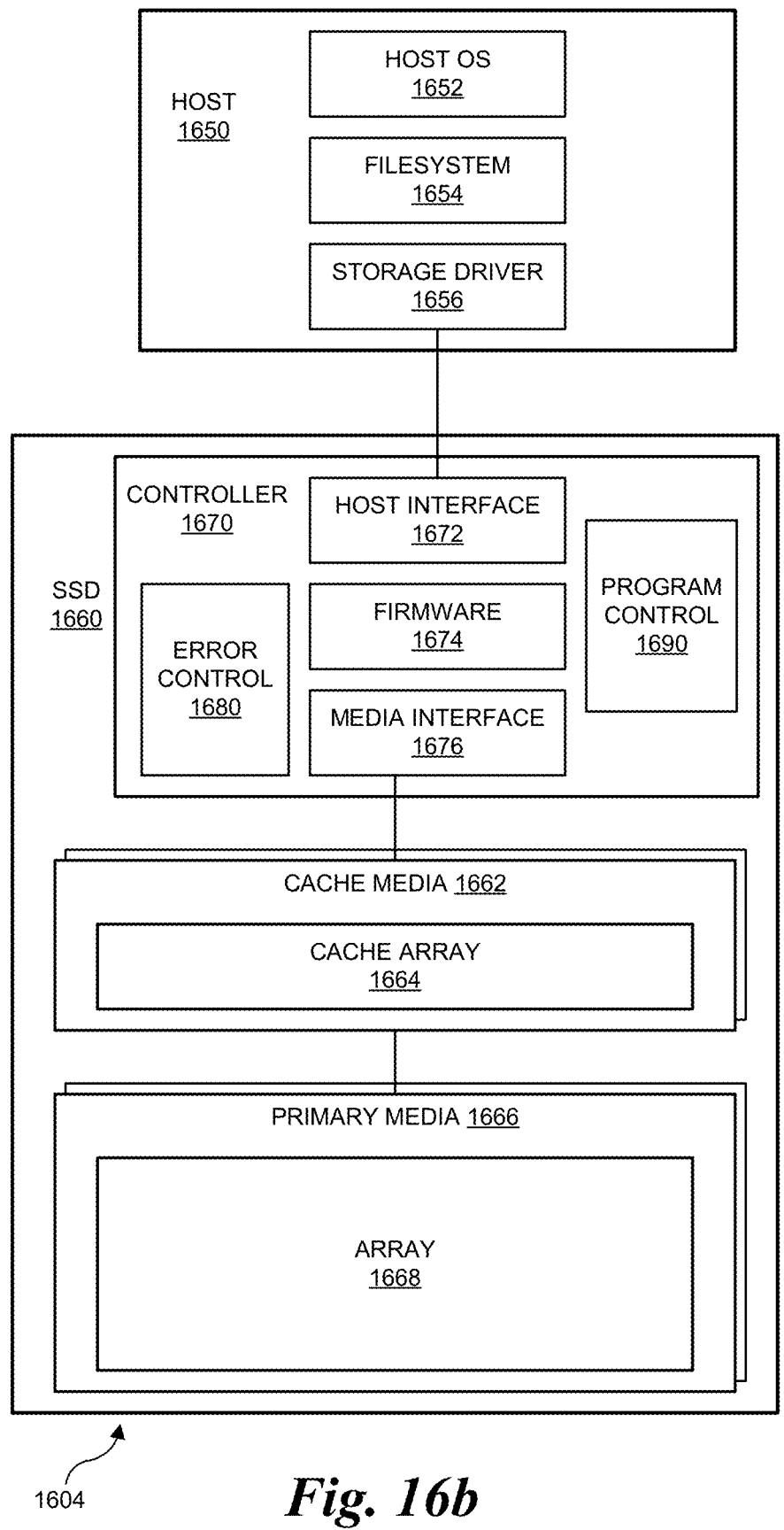
FIG. 16b is a block diagram of an example of a logical view of system with an SSD in which aspects of the embodiments disclosed herein may be implemented.

FIG. 16b is a block diagram of an example of a logical view of system with an SSD having NAND memory configured in accordance with one or more of the embodiments described above. System 1604 provides one example of a system in accordance with system 1602 of FIG. 16a. System 1604 illustrates the logical layers of the host and SSD of a hardware platform in accordance with system 1602. System 1604 can represent software and firmware components of an example of system 1602, as well as physical components. In one example, host 1650 provides one example of host 1610. In one example, SSD 1660 provides one example of SSD 1620.

In one example, host 1650 includes host OS 1652, which represents a host operating system or software platform for the host. Host OS 1652 can include a platform on which applications, services, agents, and/or other software executes, and is executed by a processor. Filesystem 1654 represents control logic for controlling access to the NV media. Filesystem 1654 can manage what addresses or memory locations are used to store what data. There are numerous filesystems known, and filesystem 1654 can implement known filesystems or other proprietary systems. In one example, filesystem 1654 is part of host OS 1652.

Storage driver 1656 represents one or more system-level modules that control the hardware of host 1650. In one example, drivers 1656 include a software application to control the interface to SSD 1660, and thus control the hardware of SSD 1660. Storage driver 1656 can provide a communication interface between the host and the SSD.

Controller 1670 of SSD 1660 includes firmware 1674, which represents control software/firmware for the controller. In one example, controller 1670 includes host interface 1672, which represents an interface to host 1650. In one example, controller 1670 includes media interface 1676, which represents an interface to the storage media. In one example, the storage media of SSD 1660 is divided as cache media 1662 and primary media 1666.

Media interface 1676 represents control that is executed on hardware of controller 1670. It will be understood that controller 1670 includes hardware to interface with host 1650, which can be considered to be controlled by host interface software/firmware 1674. Likewise, it will be understood that controller 1670 includes hardware to interface with the media. In one example, code for host interface 1672 can be part of firmware 1674. In one example, code for media interface 1676 can be part of firmware 1674.

In one example, controller 1670 includes error control 1680 to handle data errors in accessed data, and corner cases in terms of compliance with signaling and communication interfacing. Error control 1680 can include implementations in hardware or firmware, or a combination of hardware and software.

Cache media 1662 includes cache array 1664 and primary media 1666 includes array 1668. The various arrays can be any type of nonvolatile storage array. In one example, cache array 1664 is an SLC media and array 1668 is an MLC media. In one example, array 1668 comprises PLC memory. In another embodiment, array 1668 comprises QLC memory. In one example, error controller 1680 includes EEC logic similar to ECC logic 136 discussed and illustrated above.

While several of the foregoing embodiments pertain to NAND devices having PLC memory, similar teaching and principles may be applied to other types of MLC memory, such as TLC and QLC NAND devices. For example, for QLC NAND devices, the QLC program with ECC correction and QLC program-resume with ECC correction operations and device structures will be similar to that shown in FIGS. 12a, 12b, 13a, 13b, 14, and 15, except there will be four SLC pages (EP, TP, XP, LP) and there will be four SPB latches rather than five. Rather than PLC programs, QLC programs will be implemented. More generally, the teachings and principles may be applied to MLC memory storing n bit of data per cell, where n is 3 or more. Accordingly, the PLC and QLC programs may be generically represented by MLC programs that apply to MLC memory with 3 or more levels. Also, the use of page labels EP, TP, XP, UP, and LP is used to distinguish the different SLC pages, with the selection of the labels being representative examples and non-limiting.

While various embodiments described herein use the term System-on-a-Chip or System-on-Chip ("SoC") to describe a device or system having a processor and associated circuitry (e.g., Input-Output ("IO") circuitry, power delivery circuitry, memory circuitry, etc.) integrated monolithically into a single Integrated Circuit ("IC") die, or chip, the present disclosure is not limited in that respect. For example, in various embodiments of the present disclosure, a device or system can have one or more processors (e.g., one or more processor cores) and associated circuitry (e.g., IO circuitry, power delivery circuitry, etc.) arranged in a disaggregated collection of discrete dies, tiles and/or chiplets (e.g., one or more discrete processor core die arranged adjacent to one or more other die such as memory die, IO die, etc.). In such disaggregated devices and systems the various dies, tiles and/or chiplets can be physically and electrically coupled together by a package structure including, for example, various packaging substrates, interposers, active interposers, photonic interposers, interconnect bridges and the like. The disaggregated collection of discrete dies, tiles, and/or chiplets can also be part of a System-on-Package ("SoP").

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software/firmware running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A NAND memory device comprising:
   a first portion memory comprising blocks of single-level cell (SLC) memory;
   a second portion of memory comprising blocks of multi-level cell (MLC) memory storing n bits per cell, wherein n is 3 or more;
   a plurality of page buffer latches; and
   logic to:
   copy data from a set of n SLC pages in a block of SLC memory into n respective page buffer latches, wherein the set of n SLC pages of the block of SLC memory has a set of sequentially ordered page addresses; and
   copy data from the n respective page buffer latches to an MLC page in a block of MLC memory.

2. The NAND memory device of claim 1, further comprising logic to:
   employ an SLC mode to copy data from n pages in the block of SLC memory into the n respective page buffer latches;
   determine all n pages have been copied into the n respective page buffer latches; and
   switch to an MLC mode to program data from the n respective page buffer latches to the block of MLC memory.

3. The NAND memory device of claim 1, further comprising a plurality of planes, each plane having a first portion memory comprising blocks of SLC memory and a second portion of memory comprising blocks of MLC memory comprising penta-level cell (PLC) memory, and further comprising logic to:
   store an SLC start page address;
   store an SLC block address for each plane;
   select a PLC program;
   enable an enhanced input-output (IO) interface; and
   program a command with page information for a first SLC page for the block of PLC memory.

4. The NAND memory device of claim 3, wherein the logic is configured to:
   set a first feature to store the SLC state page address;
   set a second feature to store the SLC block address for each plane; and
   set a third feature to select the PLC program and enable the enhanced IO interface.

5. The NAND memory device of claim 1, further comprising a plurality of planes, each plane having a first a first portion memory comprising blocks of SLC memory and a second portion of memory comprising blocks of MLC memory comprising penta-level cell (PLC) memory, and further comprising logic to perform a program-resume operation comprising:
   storing an SLC start page address;
   storing an SLC block address for each plane;
   selecting a PLC program;
   enabling an enhanced IO interface; and
   programming resume.

6. The NAND memory device of claim 1, further comprising:
   one or more memory buffers;
   Error Correction Code (ECC) logic; and
   logic to:
   copy data from a second set of n SLC pages in a block of SLC memory to a memory buffer;
   perform ECC correction on the data using the ECC logic; and
   copy the data from the memory buffer to a second MLC page in a block of MLC memory.

7. The NAND memory device of claim 6, wherein the logic is configured to:
   read data from the second set of n SLC pages,
   perform ECC correction on the read data; and
   write data for which ECC correction has been performed to the memory buffer.

8. The NAND memory device of claim 1, wherein n=5 and the MLC memory comprises penta-cell level (PCL) memory.

9. The NAND memory device of claim 1, wherein n=4 and the MLC memory comprises quad-cell level (QCL) memory.

10. A method, comprising:
    at a NAND memory device comprising a first portion memory comprising blocks of single-level cell (SLC) memory and a second portion of memory comprising blocks of multi-level cell (MLC) memory storing n bits per cell, wherein n is 3 or more:
    copying data from a set of n SLC pages in a block of SLC memory into n respective page buffer latches, wherein the set of n SLC pages of the block of SLC memory has a set of sequentially ordered page addresses; and
    copying data from the n respective page buffer latches to an MLC page in a block of MLC memory.

11. The method of claim 10, further comprising:
    employing an SLC mode to copy data from n pages in the block of SLC memory into the n respective page buffer latches;
    determining all n pages have been copied into the n respective page buffer latches; and
    switching to an MCL mode to program data from the n respective page buffer latches to the block of MLC memory.

12. The method of claim 10, wherein the NAND device further comprises a plurality of planes, each plane having a first a first portion memory comprising blocks of SLC memory and a second portion of memory comprising blocks of MLC memory, further comprising:
    storing an SLC start page address;
    storing an SLC block address for each plane;
    selecting an MLC program;
    enabling an enhanced input-output (IO) interface; and
    programming a command with page information for a first SLC page for the block of MLC memory.

13. The method of claim 12, further comprising:
    setting a first feature to store the SLC state page address;
    setting a second feature to store the SLC block address for each plane; and
    setting a third feature to select the MLC program and enable the enhanced IO interface.

14. The method of claim 10, wherein the NAND memory device further comprises a plurality of planes, each plane having a first a first portion memory comprising blocks of SLC memory and a second portion of memory comprising blocks of MLC memory, further comprising:
    storing an SLC start page address;
    storing an SLC block address for each plane;
    selecting an MLC program;
    enabling an enhanced IO interface; and
    programming resume.

15. The method of claim 10, wherein n=5 and the MLC memory comprises penta-cell level (PCL) memory.

16. The method of claim 10, wherein n=4 and the MLC memory comprises quad-cell level (QCL) memory.

17. A system, comprising:
    a host, having a first input-output (IO) interface;
    a NAND device having a second IO interface coupled to the first IO interface, the NAND device further including,
    a first portion memory comprising blocks of single-level cell (SLC) memory;
    a second portion of memory comprising blocks of penta-level cell (PLC) memory;
    a plurality of page buffer latches; and
    logic to:
    copy data from a set of five SLC pages in a block of SLC memory into five respective page buffer latches; and
    copy data from the five respective page buffer latches to a PLC page in a block of PLC memory.

18. The system of claim 17, further comprising logic to:
    employ an SLC mode to copy data from five pages in the block of SLC memory into the five respective page buffer latches;
    determine all five pages have been copied into the five respective page buffer latches; and
    switch to a PCL mode to program data from the five respective page buffer latches to the block of PLC memory.

19. The system of claim 17, wherein the NAND device further comprises a plurality of planes, each plane having a first a first portion memory comprising blocks of SLC memory and a second portion of memory comprising blocks of PLC memory, the NAND device further comprising logic to:
  store an SLC start page address;
  store an SLC block address for each plane;
  select a PLC program;
  enable an enhanced input-output (IO) interface; and
  program a command with page information for a first SLC page for the block of PLC memory.

20. The system of claim 17, wherein the logic for the NAND device is configured to:
  set a first feature to store the SLC state page address;
  set a second feature to store the SLC block address for each plane; and
  set a third feature to select the PLC program and enable the enhanced IO interface.

* * * * *